United States Patent
Kfir et al.

(10) Patent No.: US 12,445,293 B2
(45) Date of Patent: Oct. 14, 2025

(54) SYSTEM AND METHOD FOR VERIFYING PRIVATE CHANNEL DATA USING SYNCHRONIZATION LOG

(71) Applicant: Digital Asset (Switzerland) GmbH, Zurich (CH)

(72) Inventors: Shaul Kfir, New York, NY (US); James Benton Litsios, New York, NY (US); Simon Meier, Zurich (CH); Lance Arlaus, New York, NY (US); Alexander Bernauer, Zurich (CH); Tamas Blummer, New York, NY (US); Walter Eric Saraniecki, New York, NY (US); Miron Cuperman, New York, NY (US)

(73) Assignee: Digital Asset (Switzerland) GmbH, Zurich (CH)

( * ) Notice: Subject to any disclaimer, the term of this patent is extended or adjusted under 35 U.S.C. 154(b) by 611 days.

(21) Appl. No.: 17/842,018

(22) Filed: Jun. 16, 2022

(65) Prior Publication Data

US 2023/0412389 A1  Dec. 21, 2023

Related U.S. Application Data

(63) Continuation of application No. 16/317,917, filed as application No. PCT/US2017/042155 on Jul. 14, 2017, now abandoned.

(60) Provisional application No. 62/368,686, filed on Jul. 29, 2016.

(51) Int. Cl.
| | | |
|---|---|---|
| *H04L 9/32* | (2006.01) | |
| *G06F 21/62* | (2013.01) | |
| *H04L 9/00* | (2022.01) | |

(52) U.S. Cl.
CPC ............ *H04L 9/3239* (2013.01); *G06F 21/62* (2013.01); *H04L 9/50* (2022.05)

(58) Field of Classification Search
CPC ....... H04L 9/3239; H04L 9/50; H04L 9/0891; H04L 9/12; G06F 21/62
See application file for complete search history.

(56) References Cited

U.S. PATENT DOCUMENTS

| | | |
|---|---|---|
| 5,966,706 A | 10/1999 | Biliris et al. |
| 8,655,782 B2 | 2/2014 | Poon et al. |
| 11,631,063 B2 * | 4/2023 | Dowding ............... G06Q 20/06 705/64 |
| 2003/0061537 A1 | 3/2003 | Cha et al. |
| 2003/0196099 A1 | 10/2003 | Lampson et al. |
| 2006/0009999 A1 | 1/2006 | Gee et al. |
| 2007/0067349 A1 | 3/2007 | Jhaveri et al. |
| 2007/0162518 A1 * | 7/2007 | Tian .................... H04L 9/3242 |
| 2009/0122812 A1 | 5/2009 | Steiner et al. |

(Continued)

*Primary Examiner* — Taghi T Arani
*Assistant Examiner* — Blake I Narramore
(74) *Attorney, Agent, or Firm* — Foley & Lardner LLP (57) ABSTRACT

A computer system comprising: a global synchronization log that stores public data associated with private data wherein the private data is stored in one or more private data stores separate from the global synchronization log; and one or more nodes operable in a mode as a writer node that has access to write the public data associated with private data to the global synchronization log. A reader node may verify the public data on the global synchronization log with private data stored in one or more private data stores.

14 Claims, 9 Drawing Sheets

(56) References Cited

U.S. PATENT DOCUMENTS

| | | |
|---|---|---|
| 2010/0106974 A1 | 4/2010 | Aguilera et al. |
| 2010/0110935 A1* | 5/2010 | Tamassia ............ H04L 67/1065 |
| | | 370/256 |
| 2010/0162249 A1 | 6/2010 | Shpeisman et al. |
| 2013/0166455 A1 | 6/2013 | Feigelson |
| 2013/0317984 A1 | 11/2013 | O'Leary et al. |
| 2014/0089606 A1 | 3/2014 | McKenney |
| 2014/0201524 A1* | 7/2014 | Dittrich .................. G06F 21/45 |
| | | 713/165 |
| 2014/0229739 A1 | 8/2014 | Roth et al. |
| 2014/0230007 A1 | 8/2014 | Roth et al. |
| 2014/0279540 A1 | 9/2014 | Jackson |
| 2014/0279557 A1 | 9/2014 | Abou-Nasr et al. |
| 2014/0298042 A1 | 10/2014 | Ogura et al. |
| 2014/0380402 A1 | 12/2014 | Roth |
| 2015/0120569 A1 | 4/2015 | Belshe et al. |
| 2015/0161414 A1 | 6/2015 | Pandian et al. |
| 2015/0205929 A1 | 7/2015 | Brama |
| 2015/0209678 A1 | 7/2015 | Edwards et al. |
| 2015/0235011 A1 | 8/2015 | Swaminathan et al. |
| 2015/0254640 A1 | 9/2015 | Cassano et al. |
| 2015/0262173 A1 | 9/2015 | Durbin et al. |
| 2015/0262176 A1 | 9/2015 | Langschaedel et al. |
| 2015/0287014 A1 | 10/2015 | Granbery |
| 2015/0294308 A1 | 10/2015 | Pauker et al. |
| 2015/0324789 A1 | 11/2015 | Dvorak et al. |
| 2015/0332256 A1 | 11/2015 | Minor |
| 2015/0341176 A1 | 11/2015 | Staykov et al. |
| 2015/0363769 A1 | 12/2015 | Ronca et al. |
| 2015/0363770 A1 | 12/2015 | Ronca et al. |
| 2015/0363772 A1 | 12/2015 | Ronca et al. |
| 2015/0363773 A1 | 12/2015 | Ronca et al. |
| 2015/0363777 A1 | 12/2015 | Ronca et al. |
| 2015/0363778 A1 | 12/2015 | Ronca et al. |
| 2015/0363782 A1 | 12/2015 | Ronca et al. |
| 2015/0363783 A1 | 12/2015 | Ronca et al. |
| 2015/0363876 A1 | 12/2015 | Ronca et al. |
| 2015/0365283 A1 | 12/2015 | Ronca et al. |
| 2015/0379510 A1* | 12/2015 | Smith .................... G06F 21/64 |
| | | 705/71 |
| 2016/0188297 A1 | 6/2016 | Kuroiwa |
| 2017/0250815 A1* | 8/2017 | Cuende ................ G06Q 20/401 |
| 2019/0081785 A1* | 3/2019 | Mandal ................ H04L 9/3239 |
| 2021/0314140 A1* | 10/2021 | Stephenson ........... H04L 9/3066 |
| 2023/0177211 A1* | 6/2023 | Giraud ................ G06F 21/6254 |
| | | 713/193 |

\* cited by examiner

SYSTEM AND METHOD FOR VERIFYING PRIVATE CHANNEL DATA USING SYNCHRONIZATION LOG

CROSS-REFERENCE TO RELATED APPLICATIONS

The present application is a continuation of U.S. patent application Ser. No. 16/317,917, filed on Jan. 15, 2019, the disclosure of which is incorporated herein by reference, which claims priority from International Patent Application No. PCT/US2017/042155, filed on Jul. 14, 2017, which claims priority from U.S. Provisional Patent Application No. 62/368,686, filed on Jul. 29, 2016.

TECHNICAL FIELD

The present disclosure relates to the field of distributed ledgers. In some examples, this relates to a system for maintaining synchronicity of segregated private data stores.

BACKGROUND

Existing closed, centrally administered ledgers utilized for settling assets, obligations, and transactions are considered opaque and error-prone. This makes oversight cumbersome, requires many duplicative processes and ledgers, and allows the potential for fraud. The first and currently largest alternative to the existing ledger architectures is represented by a distributed digital ledger called Bitcoin, which uses a blockchain data structure.

A fundamental principle of Bitcoin's operation is that the system is set up as a peer-to-peer transaction mechanism that utilizes public-private key cryptography, has no central intermediary or central repository, and allows all participants in the network to hold and validate the integrity of a full copy of the ledger in real time. The Bitcoin blockchain was designed in order to create a trustless native asset, bitcoin, which could be exchanged with pseudonymous parties across the globe.

Ethereum is another distributed ledger network. Ethereum supports a number of smart contract languages which allow agreements to be written in code that can be executed automatically by the network. These self-enforcing agreements independently control and automate the exchange of escrowed value according to predetermined rules based on predefined inputs. This is a notable feature as all smart contracts on Ethereum have to be executed by multiple participants in the network, including and especially those not party to the contract. Thus any third party can not only view all transactions but can also know the exact terms of those contracts. Ethereum therefore lacks privacy.

Current platforms built to support digital assets on top of Bitcoin-like or blockchain-like systems are not generally structured to provide comprehensive protection to financial institutions as may be required by law for many of their existing transaction businesses.

Regulatory regimes for financial institutions generally require trusted entities such as market operators and auditors to have full access to the information in a ledger. At the same time, other entities such as investors need to ensure their information remains private and hidden from other entities (such as competing investors). This creates a technical problem of having a shared distributed ledger that all entities agree is correct but where only some participants have full access to the information in the ledger. Bitcoin, being a largely anonymous network where there is little differentiation of roles, is not suitable for such a system.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

There is provided a computer system comprising: a global synchronization log that stores public data associated with private data wherein the private data is stored in one or more private data stores separate from the global synchronization log; and one or more nodes operable in a mode as a writer node that has access to write the public data associated with private data to the global synchronization log.

The global synchronization log and private data may be wholly replicated across participants, or segments can be partially replicated across a subset of participants. The integrity of the data is ensured in order to allow each entity to rely on its veracity and to know that data they are entitled to view is consistent with that viewed by others entitled to view the same data. This does not just synchronize the record of ownership and obligations, but also provides a common protocol for processing data, which can ensure that the private data is processed in the same, mutually agreed manner without revealing the private data itself.

Preferably the computer system further comprises the one or more private data stores.

Preferably the one or more nodes are in communication with respective one or more private data stores, and wherein the writer nodes receive private data to execute a function to determine the corresponding public data to write to the global synchronization log.

Preferably the public data includes a hash value and wherein the function is a cryptographic hash function that produces the hash value from the private data, and wherein it is computationally infeasible to reconstruct the private data from the hash value.

Preferably the computer system further comprises one or more nodes operable in a mode as a reader node, wherein the reader node receives corresponding private data and wherein the corresponding private data in the one or more private data stores are not accessible to an unauthorized participant.

Preferably at least one of the nodes operable in a mode as a reader node does not have access to perform write operations on the global synchronization log.

Preferably a reader node can verify the public data available on the global synchronization log based on the corresponding private data available to the reader node in the one or more private data stores. Alternatively, attestation or proof of verification may be performed by one node and sent to another node.

Preferably the global synchronization log is implemented by with an event-sourced architectural pattern.

Preferably the global synchronization log is implemented by a Command Query Responsibility Segregation (CQRS) pattern.

Preferably the global synchronization log is an append-only distributed ledger.

Preferably the global synchronization log is a blockchain.

Preferably the private data store is a private contract store configured to store one or more contract parameters corresponding to a participant's contracts.

Preferably one or more auditor nodes that can inspect the global synchronization log to ensure that the global synchronization log is an accurate representation of transactions that have taken place by accessing and comparing with information in one or more private data stores.

There is provided a computer system with two or more nodes comprising: at least one a private data store that stores private data; a global synchronization log that stores public data associated with private data in the private data stores, wherein the private data is stored in a plurality of data stores separate from the global synchronization log; a first node operable in a mode as a writer node, wherein the first node is associated with a first private data store that stores first private data, and wherein the first node has access to the global synchronization log to write first public data associated with the first private data and a second mode as a reader node; and a second node operable in a mode as a writer node, wherein the second node is associated with a second private data store that stores second private data, and wherein the second node has access to the global synchronization log to write second public data associated with the second private data.

Preferably the first node is operable as a reader node to verify the public data, including the first public data, available on the global synchronization log based on comparison with the first private data available to the first node in the first private data store.

Preferably the second node is operable as a reader node to verify the public data, including the second public data, available on the global synchronization log based on comparison with the second private data available to the second node in the second private data store.

A writer node comprising: an execution engine; an application; an internal fault tolerant communication channel; and one or more replicas of at least part of the system that execute a consensus protocol over the internal fault tolerant communication channel, wherein on receiving a request for data from a node, the request may be served by any one of the replicas.

Preferably the internal fault tolerant communication channel is a byzantine fault tolerant communication channel.

Preferably the replicas replicate an attestation or proof of execution and wherein on receiving a request for data from the reader node, the request may be forwarded to a writer node that generated the attestation or proof of execution.

There is provided a computer system according to the above description including a writer node according to the above description.

A computer-implemented method performed by a reader node, the method comprising: reading public data on a global synchronization log written by a writer node, wherein the public data is associated with private data and the private data is stored in one or more private data stores; receiving corresponding private data from the one or more private data stores; verifying the public data from the global synchronization log with the corresponding private data, and based on verifying the public data is verified with the corresponding private data, determining that the corresponding private data is synchronized with the private data.

In the computer-implemented method, wherein if the public data is not verified with the corresponding private data, the method further comprises: initiating a request for updated private data from the one or more nodes; receiving the updated private data from the one or more nodes; verifying the public data from the global synchronization log with the updated private data; and based on verifying the public data is verified with the updated private data, determining that the updated private data is synchronized with the private data.

BRIEF DESCRIPTION OF DRAWINGS

Examples of the present disclosure will be described with reference to.

DESCRIPTION OF EMBODIMENTS

Overview

The following is a computer system that maintains privacy for participants by concealing private data from other participants but at the same time providing a ledger with public data which can be used to verify information and the integrity of information. Therefore the computer system can provide an assurance about the integrity of private data.

Unlike a network of segregated ledgers that lacks a global arbiter of the truth where the system cannot guarantee network participants integrity of the complete set of relevant data, the present disclosure utilizes a global synchronization log, which maintains confidentiality of the physically segregated ledgers.

The global synchronization log is a shared and globally replicated log that allows for the private data stored in one or more private data stores to be synchronized in the sense that it provides a mechanism by which private data store can maintain accurate and up to date data. It is not intended in this disclosure that the global synchronization log necessarily causes an update of data stored in a private data store to occur, rather that the global synchronization log is a means by which a private data store can be made to be consistent with the public data on the global synchronization log as well as the private data of other participants. If a node (or participant in communication with a node explained further below) determines there is private data that needs to be updated, then the node can request such data. Further synchronization does not necessarily mean that a private data store is to store the same data as another private data store, rather that a private data can store data that is provably consistent with the public data and that inconsistencies with the public data may be flags to the nodes and/or participants that private data should be updated.

Although this system can be used for synchronization of any kinds of private data, one intended use case is for a synchronized system for settling transactions in financial markets. A financial market has different types of actors, and each actor has different levels of responsibility and confidentiality requirements. For example, in most financial markets, it is imperative that an actor who is a participant in the market cannot view the private and confidential contracts and contract events of their competitors and vice versa. But a participant may tolerate inspection of private data such as contracts by a trusted party such as a market operator or auditor. This includes, but is not limited to, an official auditor who is authorized to conduct audits of participants and/or nodes.

Nodes and Participants

In the present disclosure, reference is made to a node which is a computer or system that interacts with the computer system. The various nodes connected to the shared infrastructure of the computer system may have different modes. Nodes are operable in different modes and a node may have several modes: Reader Mode, Writer Mode and Auditor Mode. Each of these modes gives a different level of access to the global synchronization log and the private data stores.

A node may be itself, or connected to, one or more participants. There are several types of participants in the system.

A network participant is a participant in the system that operates a node. They may be considered direct participants because they have direct access to read or write to the global synchronization log. In an example of a financial market, there may be market operators that operate and may also be responsible for maintaining the rules of the market. Operators may govern access to the global synchronization log. This globally replicated log is a permissioned ledger, meaning it is a ledger accessible (for reading or for writing) only by known and pre-approved nodes with associated participants.

Another type of participant is an indirect participant. The indirect participants do not operate a node and therefore they may connect to the network through interfaces run by others. Indirect participants delegate actions on the global synchronization log to a third party who interacts with the global synchronization log 114 on their behalf.

Private data is data that is private and confidential to a participant and where the node associated with the participant maintains privacy for the participant. It is to be appreciated that private data of a participant may be stored in confidence, with the authority of the participant, by other nodes.

Reader Mode

When a node is operable in a reader mode referred to herein as a reader node, the reader node becomes a network node that acts on behalf of participants that might be involved in some contracts or for supervising authorities. The reader node may monitor for notifications for its served participants on the global synchronization log, and may aggregate a partial database of private data.

Writer Mode

When a node is operable as a writer node, referred to herein as a writer node the node records evidence into global synchronization log. The writer node may also guarantee the contradiction-less recording of evidence and, as a consequence, has full access into private data that it records as public data. The role of the writer node might be shared by several nodes, such that a write to the global synchronization log requires joint authorization by them in certain scenarios. In some examples, a participant who is an operator would run a node that is both a writer and a reader node in order to be able to submit data on its own. Alternatively a participant who is an operator may operate two separate nodes: one of which is a writer node; the other is a reader node.

Auditor Mode

A third mode is that of an "auditor" node. An auditor in the present disclosure is a node authorized to run in auditor mode which has access to private data for the purposes of determining the integrity of at least part of the data in the system. An auditor may have partial access to private data to ensure the integrity of the global synchronization log is maintained. An auditor node may be associated with an auditor participant (such as an official auditor) who utilizes the auditor node to perform integrity checks on the data in the system. It is to be appreciated that the "auditor" node may be associated with participants that have an interest in ensuring the integrity of the data such as a regulatory authority, market operator, or other authorized person.

Single Logical Writer Node Architecture

Figure 1:
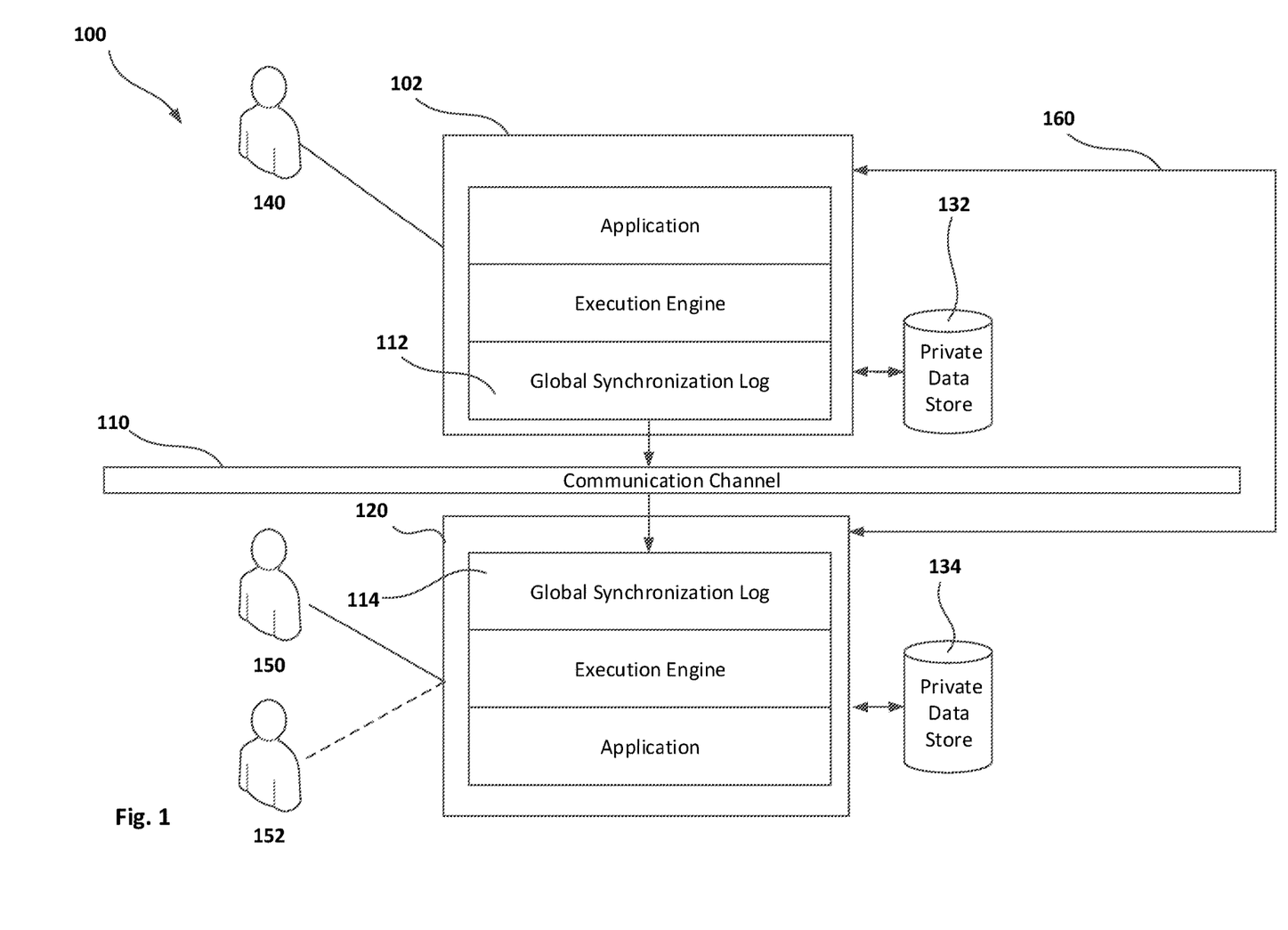
FIG. 1 is an illustration of a simple example deployment of a computer system with a single writer node and a single reader node.

FIG. 1 is an illustration of a simple example deployment of a computer system 100. In this example, there are multiple participants (140, 150, 152). The operator 140 is the only participant who has access to write to the global synchronization log 112 because it is operates a writer node 102. In this example, another participant 150, is not an operator but still has access to the global synchronization log 114 by operating a reader node 120 and can partake in distributed reading and distributed signing. The indirect participant 152 does not operate a node and therefore they may connect to the network through interfaces run by participant 150 (indicated by a dashed line in FIG. 1). As an indirect participant, the participant 152 has delegated actions on the global synchronization log 114 to a third party 150 who interacts with the global synchronization log 114 on their behalf.

The example scenario of the computer system 100 in FIG. 1 has one writer 102 and one reader 120. In this example, the node 102 has a copy of the global synchronization log 112. The communication channel 110 is used for communicating the global synchronization log between nodes 102, and 120 and in this example the communication channel 110 is a public channel that any node within the network can have access to (the communication channel 110 may be public or permissioned). The global synchronization log 112 stores public data associated with private data. The private data is stored in a private data store 132 separate from the global synchronization log 112. The private data store 132 is in communication with the node 102. Although represented as a data store external to the node 102, the private data stores may be part of the node, which may provide additional security and privacy. In this example, there is an additional communication channel 160 that is separate from the communication channel 110. It is private in that the private communication channel 160 is for communicating private data between the nodes 102 and 120. For example, the writer node 102 may communicate private data via the additional channel 160 to the reader node 120 that, in turn, stores the private data (also known as corresponding private data) in the respective data store 134. In some examples, at least part of the private data in the private data store 132 of the writer node is identical to the corresponding private data in the private data store 134 of the reader node. The private communication channel 160 can be configured as a physically segregated channel between 102 and 120 or as an encrypted channel embedded with the public communication channel 110.

In the example of FIG. 1, the first node 102 is operable as a writer node that has access to write the public data associated with private data to the global synchronization log (112, 114). The writer node 102 receives private data to execute a function to determine the corresponding public data to write to the global synchronization log 112. In this example, the writer node 102 stores a copy of the global synchronization log 112 and the reader node 120 stores a separate copy of global synchronization log 114.

The global synchronization log (112, 114) allows synchronization of the physically segregated private data (132, 134) by sharing a globally replicated log of only fingerprints, or "hashes", of the sensitive data and execution commitments. Private data can be identified by the cryptographic hash of the private data, which also appears in the global synchronization log 112, 114, forming a link between the global synchronization log 112, 114, and the private data store 132, 134.

The hashes as described above are one-way cryptographic functions which can be proven to accurately match a participant's data but do not contain any information about the private data itself nor the participants involved. In this example, the private data is a contract with two participants and the function is a cryptographic hash function, Secure Hash Algorithm 2 (SHA-2). The SHA-2 is just used for illustrative purposes and many other cryptographic hash functions can be used. The choice of the cryptographic hash function is often a trade-off between computational resources and security. For example, a similar cryptographic hash function Secure Hash Algorithm 3 (SHA-3) is more secure than SHA-2, but SHA-2 requires less computational resources. There may be other reasons to choose a particular type of cryptographic hash function, such as a cryptographic hash function that has specific properties or there may be regulatory requirements that affect the available cryptographic hash functions. For example, regulatory requirements may allow SHA-2 to be used and prohibit BLAKE-2 (a cryptographic hash function based on the ChaCha stream cipher).

It should be noted that the hashes themselves do not need to appear in the global synchronization log 112, 114. In one embodiment a Merkle root can be used. In this case the hashes of the private data themselves do not appear directly in the global synchronization log 112, 114. As the Merkle root is essentially a hash of the private data hashes, by committing the Merkle root of the private data hashes to the global synchronization log 112, 114 the hash of the private data is committed to the global synchronization log. In this embodiment, nodes can receive elements of the corresponding Merkle tree in order to establish whether the private data should be updated or whether the public data is accurate.

Single Logical Writer Node Multiple Reader Architecture

Figure 2:
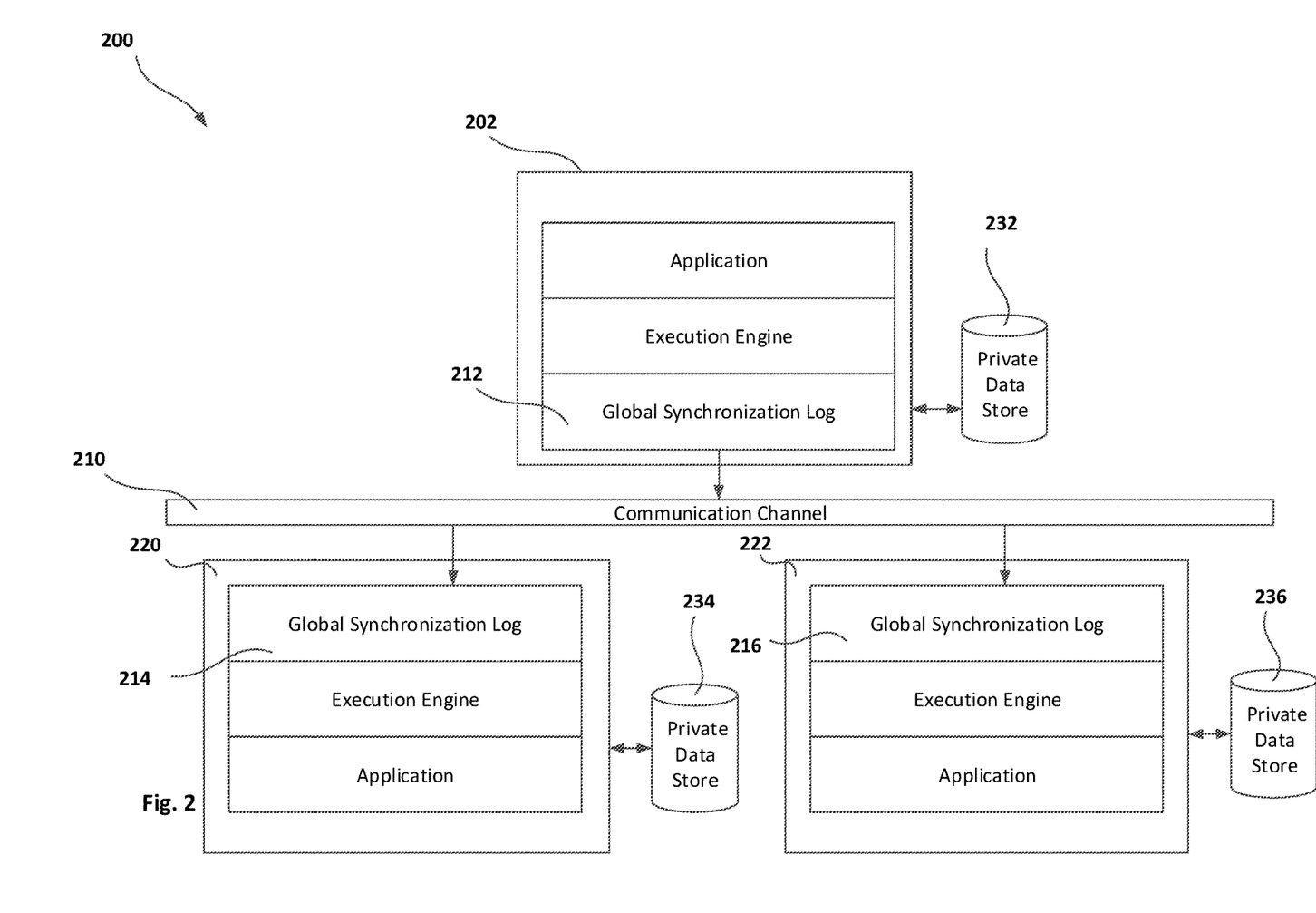
FIG. 2 illustrates an example computer system where there is only one writer node and multiple reader nodes.

FIG. 2 illustrates a computer system 200 where there is only one writer 202 and multiple readers (220, 222), that is a logical single writer and multiple readers all running the same stack but operable in distinct read and write modes. In this example, only the writer node 202 has permission to write to the global synchronization log 212, whereas the reader nodes 220 and 222 have permission to read the global synchronization log 214, 216, but do not have permission to write to it. For simplicity, the participants have not been illustrated as in FIG. 1, but it may be assumed that a node interacts with the system on behalf of one or more participants. Also for simplicity, the private communication channels have not been illustrated as in FIG. 1, but it may be assumed that each node may have a private communication channel to request and communicate private data with one or more other nodes.

In this configuration, reader nodes 220, 222 can generate and propose updates to the global synchronization log, but must forward these to the write node 202. When the updates are persisted to the global synchronization log, this will cause the update to be considered executed. The reader node 220, 222 may monitor the global synchronization log 214 for notifications for any participants that are using that reader node. If the reader node 220, 222 does not have the corresponding private data already then the reader nodes 220, 222 may request unknown data from the writer node 202, which stores private data corresponding to a participant and typically would only communicate the requested data to only the node of that participant. Where a reader node 220 determines that corresponding data in the private data store 234 is inconsistent with public data available in the global synchronization log 214, the node 220 can request updated private data from the node 202 via a private communication channel (for simplicity not illustrated, see FIG. 1 160). The node 102 can subsequently communicate the requested updated private data over the private communication channel back to the node 120 in return. Reader node 222 similarly can perform the same check on corresponding private data from its private data store 236. Alternatively, the writer node 202 may attempt to pre-emptively provide (push) the reader node 222 with (corresponding or updated) private data in advance of the reader node requesting this data. This may assist in synchronizing the reader node private data store more efficiently. In either option, receiving data from a writer node 202 may be useful if a participant wants the reader node 220, 222 to verify the corresponding public data on the global synchronization log 214.

Multiple Physical Writers

Figure 3:
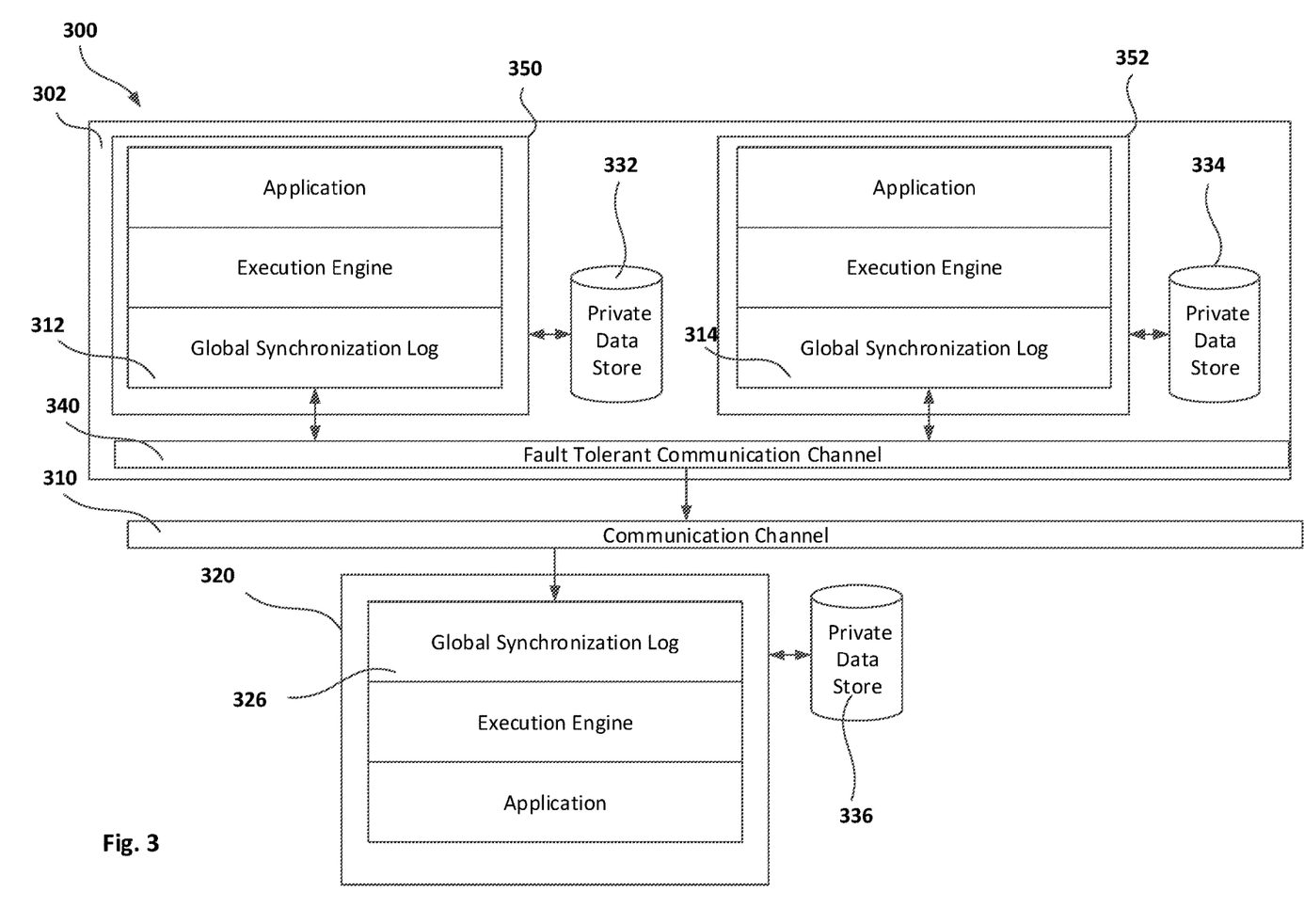
FIG. 3 illustrates an example computer system where there are multiple replicas, that are physical writers, as part of a single logical writer node as well a one reader node.

FIG. 3 illustrates an example computer system 300 where there are multiple physical writers 350, 352 as part of a single logical writer 302. There is also one reader 320. Each of the physical writers 350, 352 is a replica copy and each individually is equivalent to single writer such as those illustrated in FIG. 1, 102 and FIG. 2, 202.

In the example of FIG. 3, although the writer node 302 is a logically centralized single writer, internally it uses a standard fault tolerant replication protocol over the fault tolerant communication channel 340 between multiple replicas 350, 352, where the fault tolerant replication protocol can be used to keep the state of the system synchronized between each replica 350, 352. In this example, these replicas run a consensus protocol over an internal channel 340 so the behavior to the external readers is the same whether running one write node or multiple. The reader node 320 can request missing data from the single logical write node 302, but the response can be served from any of the replicas 350, 352, increasing availability and helping balance load.

A writer consisting of multiple physical writers may be preferable because there is a deliberate trade-off between mutually exclusive requirements. One way would be to disclose all private data to all writers, such that they each could validate the private data. However, this may violate the confidentiality requirement of the system which may be to only disclose private data to the participants authorized to see a participant's private data. So the set of nodes that perform validation has to be limited, and those nodes may attest or provide proof of data as validated so that all other nodes can accept it as valid.

In the example of a financial market which has a central market infrastructure provider and a set of major participants, the central market infrastructure provider can decide to shift the running of the replicas 350, 352 to the set of major participants and completely dematerialize their infrastructure. In this case, the major participants themselves may run multiple replicas internally with a fault-tolerant protocol over the fault tolerant communication channel 340. The system functions are similar to those described above, with the exception that the fault tolerant communication must cover Byzantine faults and occur outside of the node or system of one participant. In this configuration, a node may not replicate complete private data, but instead may replicate an attestation or proof of execution.

Multiple Reader/Writer Nodes

Figure 4:
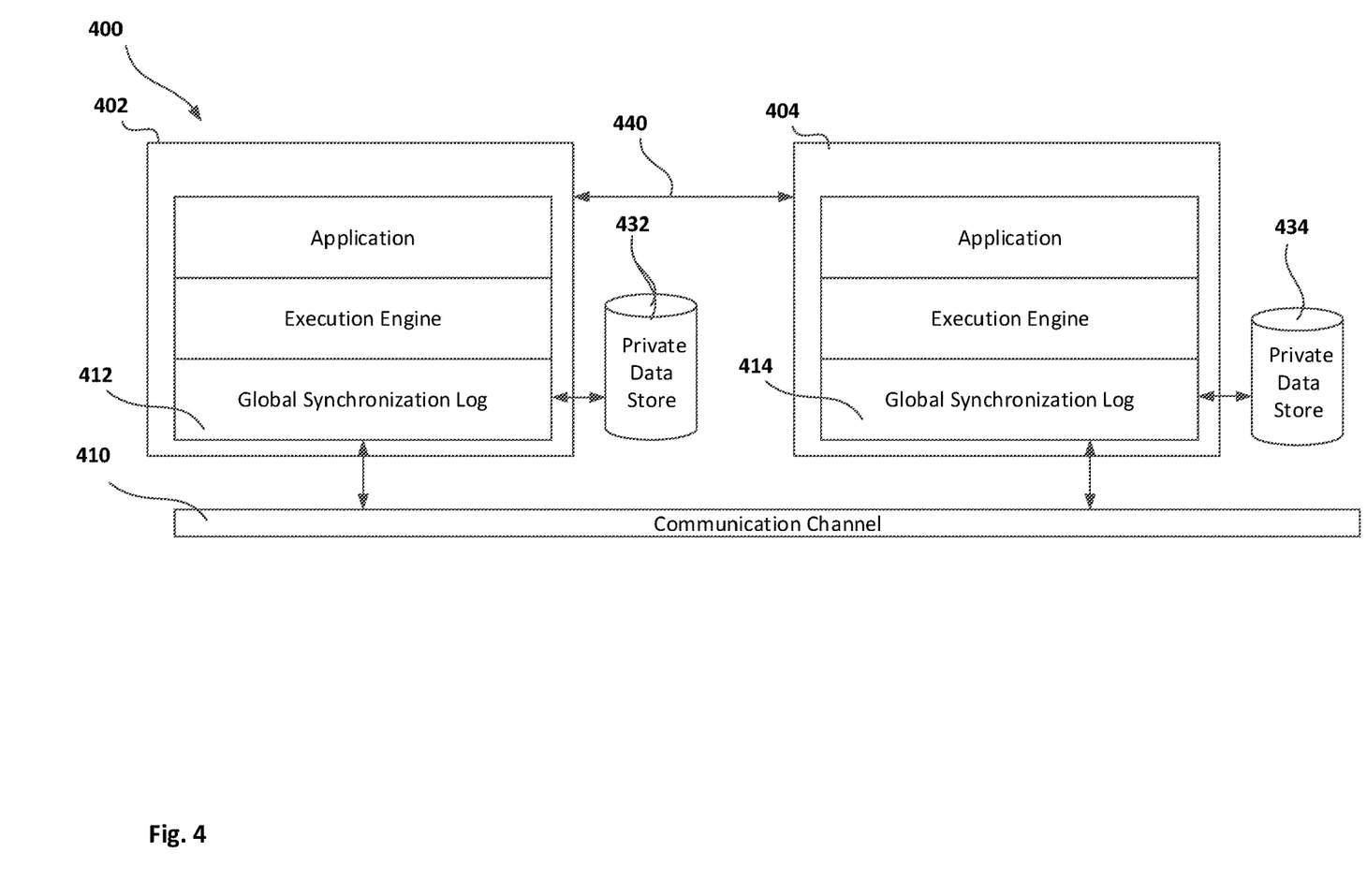
FIG. 4 illustrates an example computer system 400 where there are multiple nodes that are operable as a writer and reader nodes.

FIG. 4 illustrates an example computer system 400 where there are multiple nodes that are operable as a writer and reader nodes. In this example, the reader/writer node 402 has permission to write to the global synchronization log 412 and has permission to read the global synchronization log 412. The reader/writer node 404 has permission to write to the global synchronization log 414 and has permission to read the global synchronization log 414.

In this example, a separate communication channel 440 (like the private communication channel 160 in FIG. 1) allows the nodes, 402, 404 to communicate with one another. This may include information relevant to (or including) private data. In one example, this allows private data to be transmitted to a separate communication channel 440 (such as a separate secure channel) thereby avoiding sending private data through the communication channel 410 (which, in some examples, may be publicly accessible).

Unlike the example in FIG. 3, wherein the multiple physical writers were a single logical node, in a system 400 with multiple writers that do not trust each other regarding the integrity of the global synchronization log and the private data store, each writer has to validate data prior to commit.

Alternatively, the role of the writer node might be shared by several nodes, such that a write to the global synchronization log 412 requires joint authorization by them in certain scenarios.

Auditor Nodes

Figure 5:
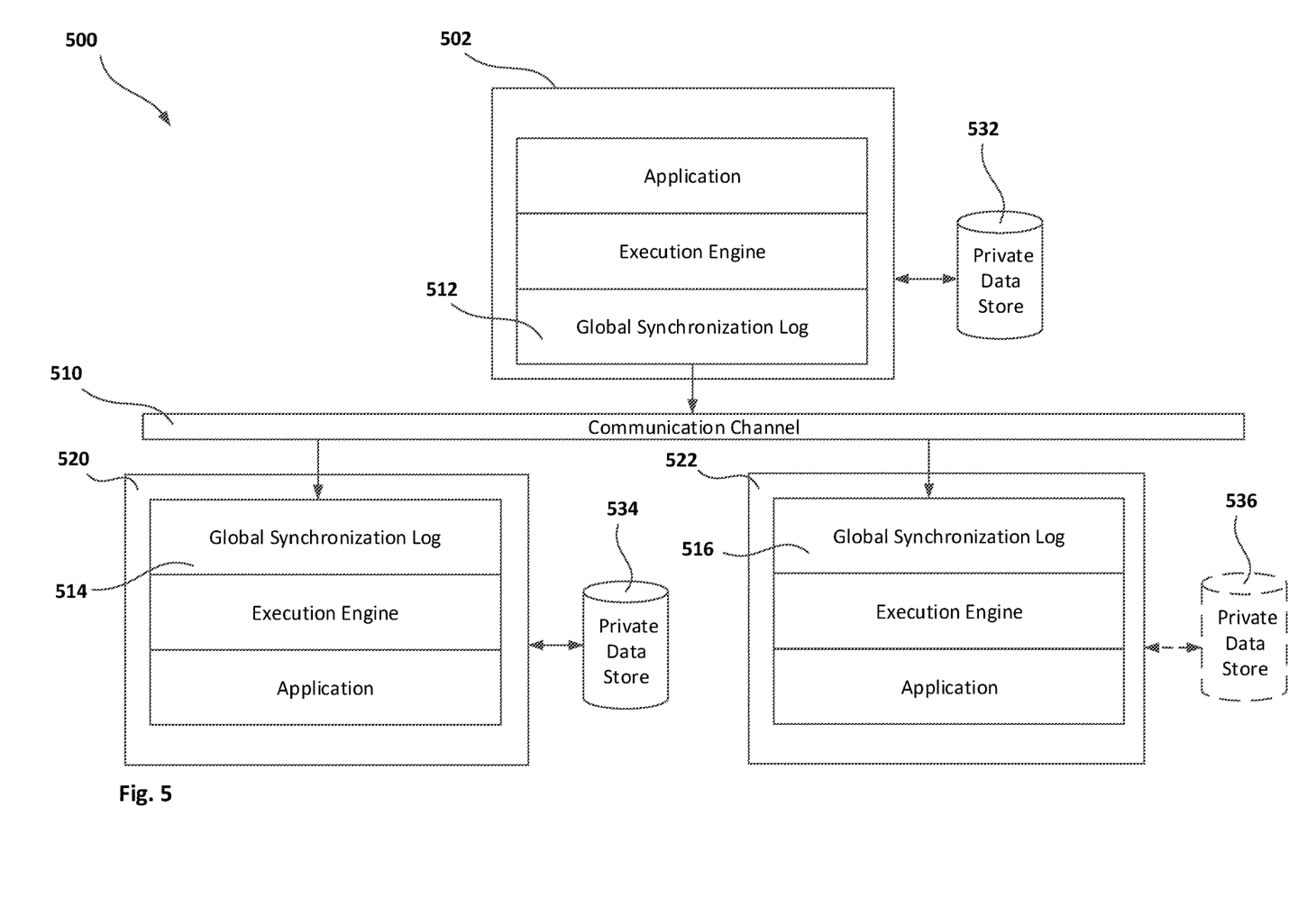
FIG. 5 illustrates an example computer system where there is a node in an auditor mode.

FIG. 5 illustrates a computer system 500 where there is a node in auditor mode 522. The purpose of an auditor node is to keep a check on the writer node 502 by proving that public data is verified and authorized and that involved participants were notified and no contradicting public data is recorded. Auditor nodes do not necessarily need their own private data store but they may have access to other nodes private data. Optionally, the auditor nodes may have their own private data store 536. In this case, where the auditor has acquired private data from another node, such as a writer node 502, the privacy of the data can be maintained.

Despite the central and powerful role of the single writer in FIG. 5 (see also the examples of FIG. 1 and FIG. 2), the trust in it is limited since any sort of compromise on the global synchronization log (512, 514, 516) will leave cryptographic evidence and will be detected. One means of detection is that all nodes, acting on behalf of one of their participants, may perform a post-commit validation of data that have affected the participant by requesting proof from the writer node 502 that the data is well-formed.

Figure 6:
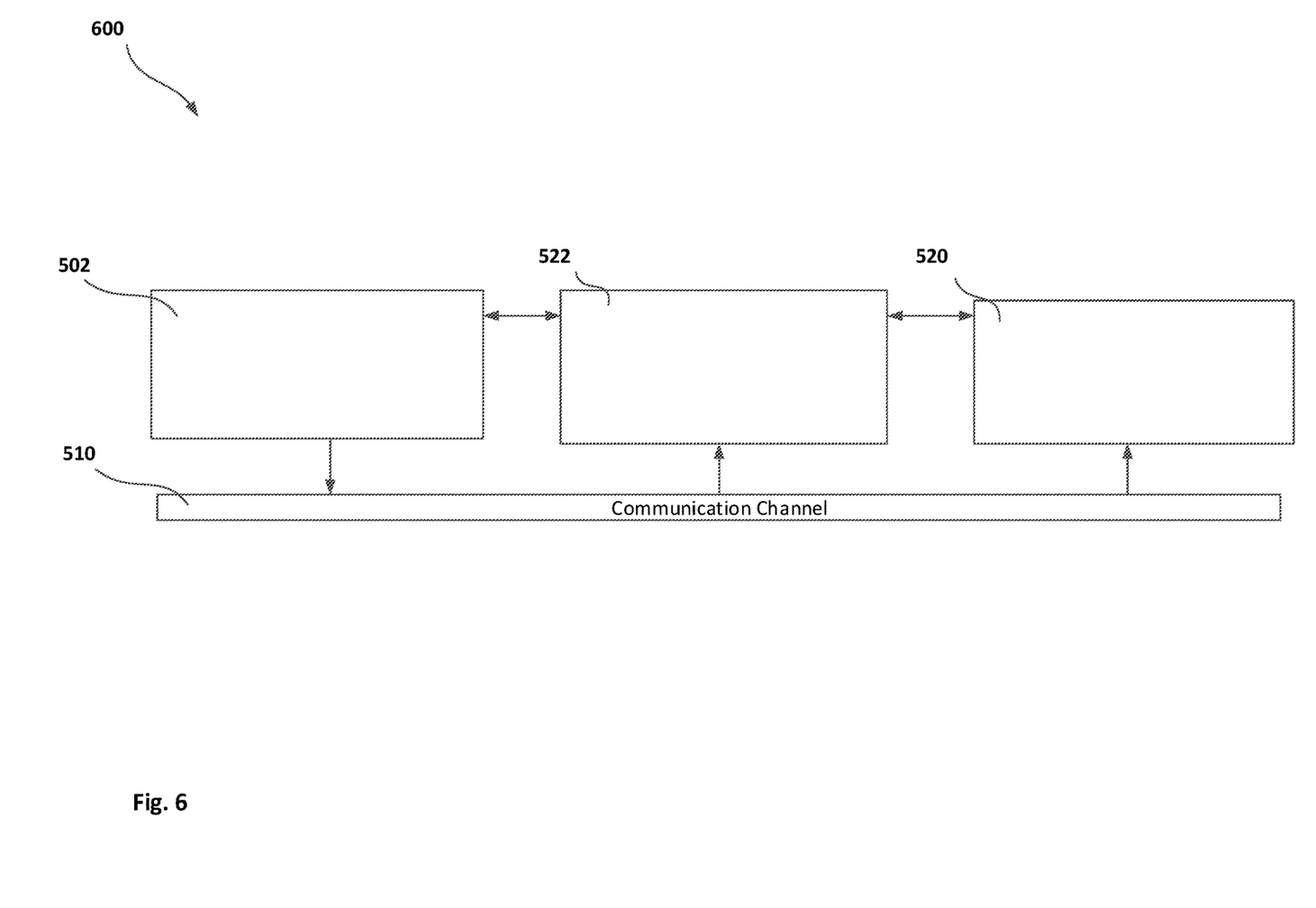
FIG. 6 is a simplified illustration of an example computer system with a node in an auditor mode.

In the simplified example of a computer system 600 in FIG. 6, nodes operable as auditors 522 (the auditor in the computer system 500), which are trusted authorities, can be used in order to make sure all participants have been notified and that the presented proof of private data refers to the right context.

Similar to the writer node, an auditor 522 will have some visibility into private data 532 and 534 and may communicate with 502 and 520 separately from the communication channel 510 that is used for the global synchronization log. As a result, it may also have knowledge of private data (such as shared secrets) for many participants. The auditor may make a comparison between the partial private data that is known or visible to the auditor and the corresponding public data in the global synchronization log. The auditor can therefore determine if a writer node has been correctly writing to the global synchronization log.

A breach of protocol by the writer node 502 would be flagged by the auditor 522 and handled outside of the described shared infrastructure. In this example, the auditor 522 is an autonomously executed algorithm running within a secure computing environment, as the auditor's task is the execution of a checking algorithm that needs no human discretion or oversight. Communication with the secure environment may be encrypted, and it may be configured so no data may leave the secure environment except for raising a flag on any failed rule validation the auditor 522 observes.

Private Contract Store

In one embodiment the private data store is a private contract store (PCS). A contract, as the term is used in this disclosure, models the rights and obligations of participants and how they are updated over time. Therefore, contracts may contain confidential information that should be revealed to those involved in the contract but to no others (except for trusted participants such as authorized operators or auditors).

In some examples, neither the private contract store nor the global synchronization log differentiates whether a given agreement is legally enforceable or otherwise. In this example embodiment the system does not make a distinction between a general agreement and one meeting the standards of a legally enforceable contract. Under particular circumstances, an agreement leading to an active agreement may meet the requirements of a legally enforceable contract in a given jurisdiction if that was the intention of the participants and their respective authorizations had legal standing. The present disclosure envisions that a master contract may be used to give agreements legal status as contracts in particular jurisdictions.

The purpose of the private contract store and the global synchronization log is to ensure a physical segregation of private and confidential contracts so that private data is not shared between participants, particularly participants who are competitors, but where the nodes have a mechanism for ensuring their associated private contract stores are synchronized and therefore accurate and up to date.

This data may be stored by a trusted node (such as a node of a market operator) and may be disclosed only to entitled participants. In some cases, all contracts can be disclosed to an auditor (such as 522 in FIG. 5 and FIG. 6) as well, so that a complete validation of the writer node's actions is possible. However, it is possible to only reveal partial information to auditors where an auditor can validate a writer node's actions based on partial information that is made available to the auditor. In any case, if validation fails, there needs to be an escalation outside of the system 500 to identify and correct the compromise on the global synchronization log.

In this embodiment private contract store is a database containing core transactions. Core transactions include the original command and the contract events that result from evaluating a command Each participant's PCS contains only the core transactions it is authorized to see in order to maintain privacy and confidentiality (such as private or confidential data to the participant). Core transactions can be identified by their cryptographic hashes, which are cryptographically committed to in the global synchronization log, forming a link between the two stores. The PCS stores complete core transactions in the case of the submitting participant, or partially hidden ones in case of other participants, according to the entitlement logic.

There are two potential paths for the core transaction. If the node is a writer node, it will directly send this to the private contract store for persistence, and if it is direct participant, it will send this to a writer for it to persist a cryptographic commitment on the global synchronization log. The writer node would check that the structure of the core transaction was valid by rerunning the command and matching the resulting events or by checking an attestation or proof of correct execution of the command, the authentication (the signature), and the authorization (that the participant has permission to exercise these choices). If it is valid, a commitment will be persisted in the global synchronization log.

The second path is triggered when an event is detected on the global synchronization log that a participant is party to and raises a notification. A node may trigger a scan of the PCS to see if the core transaction is already stored. If not, it requests it from the writer node, then verifies the events match the command, and then persists to its PCS. In the second path, the writer node may attempt to pre-emptively provide (push) the reader node with the private data to the PCS in advance of the reader node requesting this data (poll).

If the participants decide that the global synchronization log shall include all contracts, it can identify the complete set of current contracts. When representing the complete set of current contracts, the global synchronization log also acts as a publication channel to announce new contracts to the parties involved (but without publicly disclosing private data related to the contract). Notification of involved parties, in some examples, may be required for the validity of a contract. In this example, the global synchronization log stores notification tokens into the evidence of the new contract. Involved participants may monitor for their tokens. To protect privacy of involved participants, the notification token is calculated such that it is known to be linked to the participant only by the writer of the global synchronization log and the involved participants.

The notification token may be a function of a shared secret between the writer node and the notified participant. Derivation of shared secrets is made possible by prior announcement of the identities of the writer node and the involved participants on the log. Identities are tied to public keys for which the private key is kept secret by the actor behind the announced identity. The global synchronization log supports announcement and revocation of identities for regular key rolling or emergency withdrawal after a security breach affecting the participant.

By default, all parties to a contract need to authorize it. The contract might supersede a previous one. A contract is typically "eventful" in that it depends on at least one external input or event, but is not required to be. The syntax and the interpretation of a contract are left entirely up to the parties to agree "off ledger". An exemplary embodiment ledger records such off-ledger contracts, but does not attempt to interpret them.

Event-Sourced System

In one embodiment the system is a distributed event-sourced system with Command Query Response Segregation. This separation of models for commands and queries allows optimization both for command execution and data segregation when updating the ledger and also enables efficient, meaningful queries according to the domain when reading from the ledger.

Blockchain

The global synchronization log may be a blockchain. In this embodiment, the global synchronization log is appended in blocks by nodes according to an agreed protocol. A typical example of a blockchain system is Bitcoin. It is a protocol, a blockchain network, and a unit of account (the cryptocurrency "bitcoin"). It is a globally replicated ledger, where each full node in the network validates transactions and stores a copy of the entire history of the ledger. The present disclosure fundamentally differs from Bitcoin because private data is stored in segregated private data stores, however a blockchain like Bitcoin could still be used to store public data.

Example Node

Figure 7:
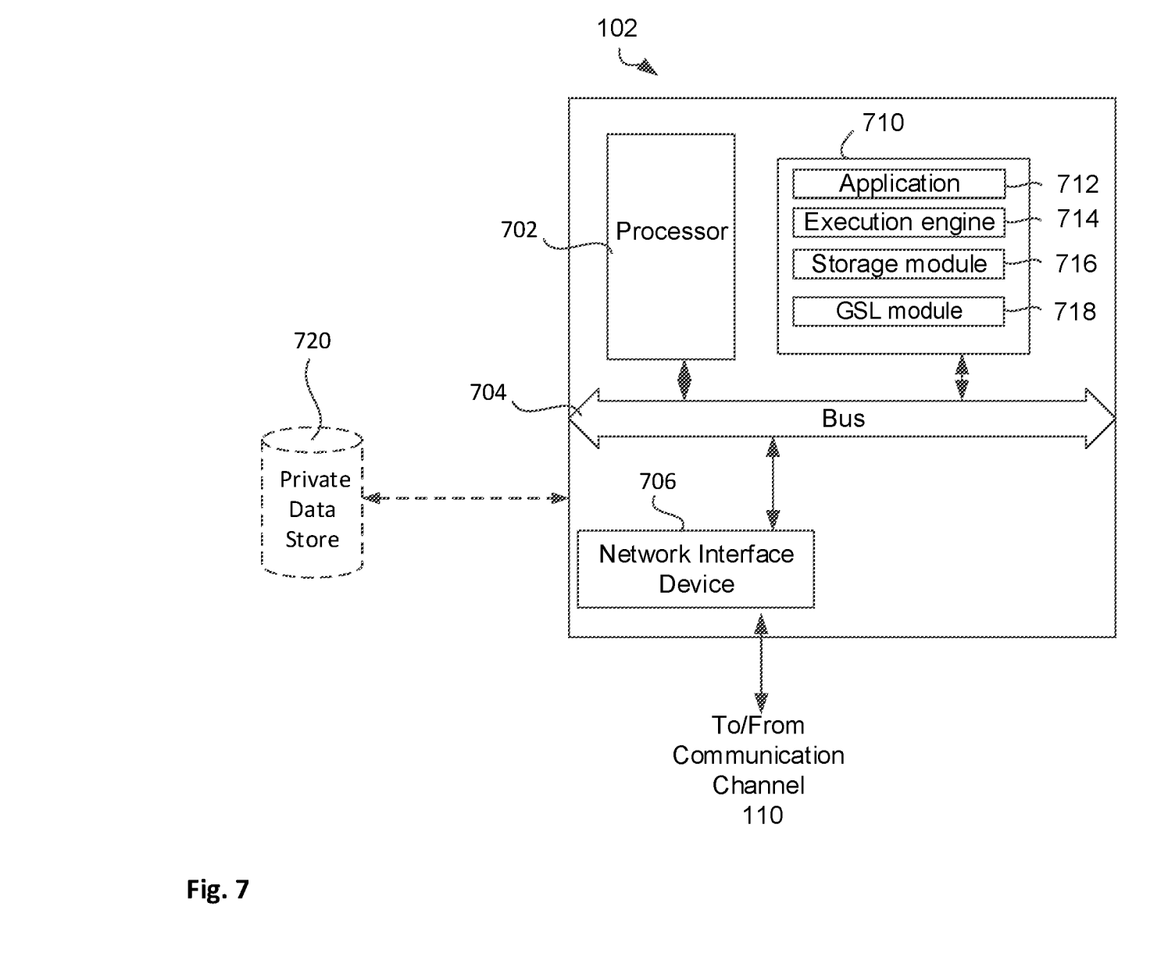
FIG. 7 is an example illustration of a node having a processor.

The node 120 shown in FIG. 7 includes a processor 702, a memory 710, and a network interface device 706 that communicate with each other via a bus 704. The memory stores instructions 712, 714, 716, and 718 and data described with reference to FIGS. 1 to 6, and the processor performs the instructions from the memory to implement the processes.

The processor 702 performs the instructions stored on memory 710. Processor 702 determines an instruction according to the Application module 712. The instruction may be a command from a participant. The processor 702 may execute instructions in 718 to monitor for notifications in the global synchronization log. The processor 702 may execute instructions stored in the global synchronization module 718 to determine whether a command is executed. The processor 702 may execute instructions in the storage module 716 to store data in a private data store 720.

Example of a Method of Verifying Synchronization

Figure 8:
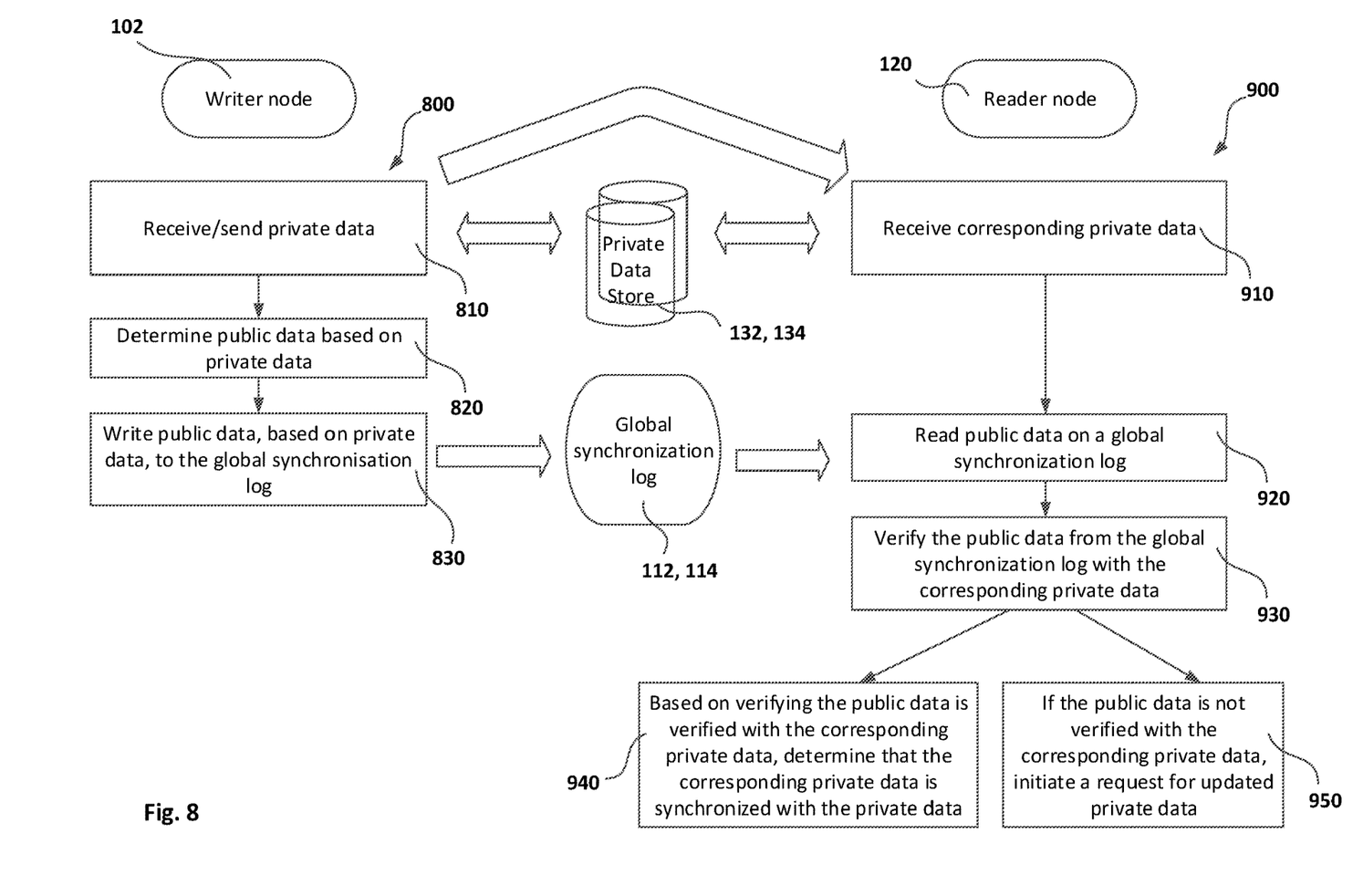
FIG. 8 is a flow diagram of a method performed by reader node.
Figure 9:
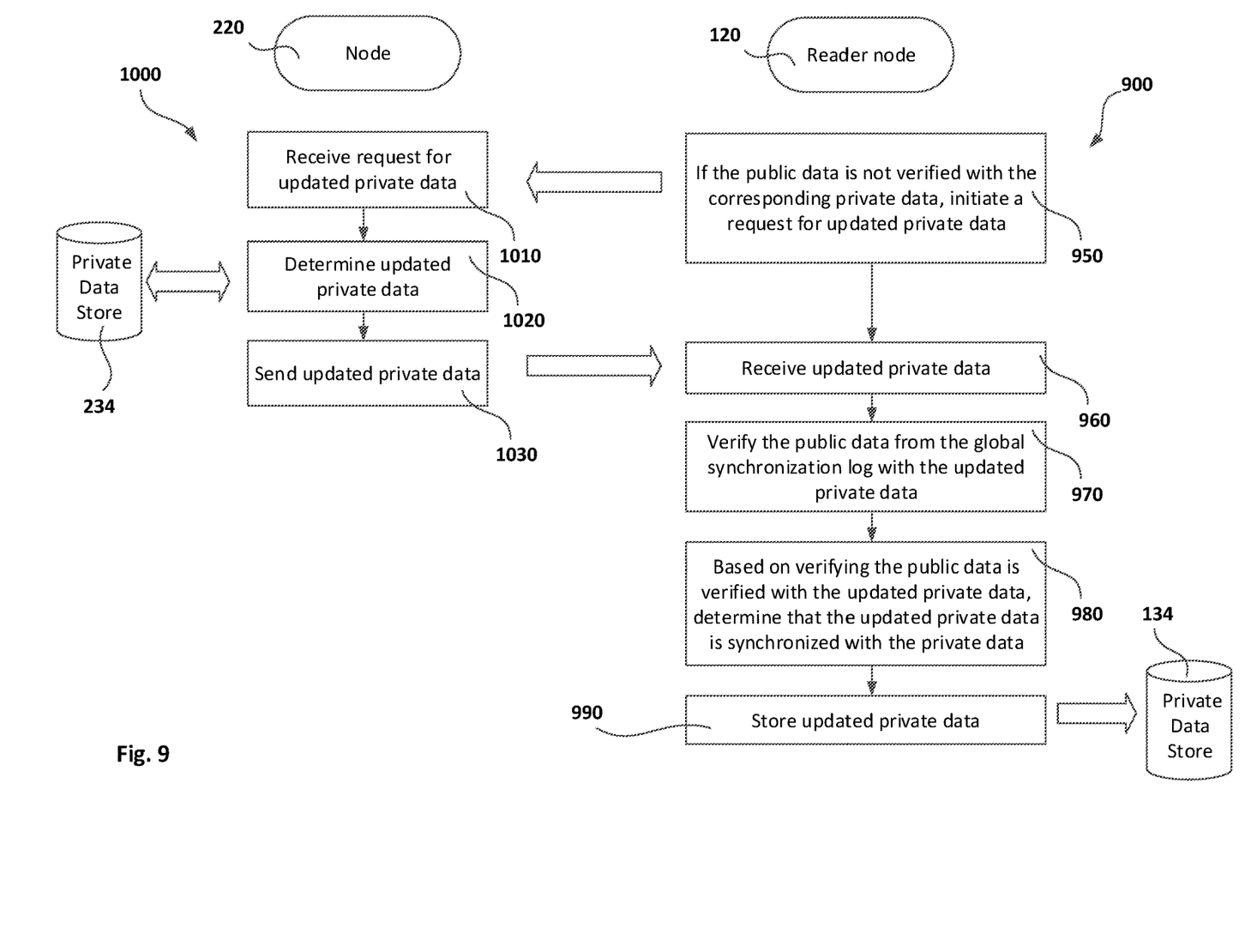
FIG. 9 is a flow diagram of the method of FIG. 8 including a request for updated private data.

FIGS. 8 and 9 illustrate a method of verifying synchronization. The writer node 102 may perform a method 800 of writing to the global synchronization log 112, 114 by receiving 810 private data. In some examples, the private data may be retrieved from the one or more private data stores 132. In other examples, the writer node 102 may receive private data from other nodes in the system. This may include private data that is pushed to the writer node 102 by other nodes, including reader nodes 120. In such cases, the writer node 102 may send the private data to a respective private data store 132 for future reference. In some examples, the writer node 102 may also send the private data to one or more other nodes authorized to have the private data.

The writer node 102 then determines 820 public data based on the private data. This may include using a hash function as described above. The writer node 102 then writes the public data to the global synchronization log 112, 114.

Turning now to the reader node 120, the method 900 includes receiving 910 corresponding private data. The corresponding private data may be the private data sent from the writer node 102 (or another node authorized to send the private data). In other examples, the reader node 120 may receive the corresponding private data from the one or more private stores 132, 134. This may include receiving the corresponding private data from the reader node's 120 own associated private data store 134 or, if authorized, another private data store. Notably, the corresponding private data is what the reader node 120 anticipates to be synchronized with the private data that was used to determine the public data.

The method 900 also includes the reader node 120 reading 920 the public data on the global synchronization log 114. This may include the reader node 120 reading the node's own copy of the global synchronization log 114 or receiving the log from another node. It is to be appreciated that steps 910 and 920 do not necessarily need to be performed sequentially.

The method 900 includes the reader node verifying 930 the public data from the global synchronization log with the corresponding private data. Based on verifying the public data is verified with the corresponding private data, the reader node can then determine 940 that the corresponding private data is synchronized with the private data that the writer node had used for writing the public data.

If the public data is not verified with the corresponding private data, the reader node may then initiate 950 a request for updated private data. That is, requesting updated private data from one or more nodes that would match the public data. This may occur in circumstances where the corresponding data that the reader node had received was incorrect, or outdated. This will now be described with reference to FIG. 9.

Another node 220 may receive 1010 the request for updated private data. In response, and if authorized to do so, the node 220 then determines 1020 the updated private data. This may include retrieving the updated private data from a private data store 234 or requesting the updated private data from other nodes. The node 220 then sends 1030 the updated private data to the reader node 120. The reader node 120 receives 960 the updated private data and repeats the verification process. This includes verifying 970 the public data from the global synchronization log with the updated private data. Based on verifying that the public data is verified with the updated private data, the reader node 120 can then determine 980 that the updated private data is synchronized with the private data. The reader node 120 may then store 990 the updated private data in the private contract store 134.

A further variation will now be described. After new public data is determined 820 from new private data, the writer node 102 writes 830 the new public data to the global synchronization log 114 and sends push data to one or more reader nodes 120. The push data received by the reader node 120 may include either:
(i) the new (or corresponding new) private data with a cryptographic proof linking the new private data to the new public data on the global synchronization log; or
(ii) a cryptographic proof that there is no new private data for that reader node 120 that is associated with the new public data on the global synchronization log ("proof of non-existence").

In one example of (ii), the cryptographic proof may include the elements of the Merkle tree associated with a Merkle root which is the new public data in the global synchronization log. The push data may be useful to the reader node 120 as they can determine that the new public data is either relevant to the reader node 120 (and in turn, they will receive the corresponding new private data) or that the new public data is not relevant to that reader node 120.

All code, data structures and the like discussed above can be stored in non-transient computer readable storage media. Functional steps described herein can be accomplished by computer code executed on a processor. The various data manipulations described above can be accomplished on stored data structures to create transformed data structures that are processed by a computer processor in a different manner. The various functions of the embodiments allow a computing system to operate in a new manner to accomplish transactions and provide new advantages. The various flowchart steps can be accomplished by software modules executed on a computer processor. Blocks illustrated in the figures can represent data structures, such as databases storing records, which are manipulated in the described manner to allow a computing system to operate on the data and transform the data.

The computer systems 100-600 are provided for simplicity and ease of reference. It is to be appreciated that a computer system may be substantially more complex in that they involve numerous participants and nodes. A real system may also involve multiple combinations of the systems outlined.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method performed by a first node of multiple nodes in a computer network that store separate copies of a global synchronization log implemented as a blockchain, the method comprising:
receiving cryptographically-protected private data from a second node of the multiple nodes in the computer network over a private communication channel;
reading public data recorded in the global synchronization log, wherein the global synchronization log indicates cryptographic representations of data in private data stores for the multiple nodes, wherein the public data is a cryptographic representation of the private data, wherein the public data is read over a public communication channel used to synchronize the separate copies of the global synchronization log, and wherein the public data is replicated to all of the multiple nodes in the computer network while the private data is replicated only at authorized nodes, of the multiple nodes, in the computer network;
verifying the private data by deciphering the private data and comparing the private data with the public data recorded in the global synchronization log; and
based on verifying the private data, updating a private data store of the first node so that the private data store of the first node is synchronized with a private data store of the second node.

2. The method of claim 1, wherein the private communication channel is an encrypted communication channel.

3. The method of claim 1, wherein the method includes the first node applying a cryptographic function to the private data to verify the public data corresponds to the private data.

4. The method of claim 1 wherein the private data is a contract comprising a computer executable command.

5. The method of claim 1 wherein the private data store of the first node is a private contract store configured to store one or more contract parameters corresponding to the first node's contracts with other nodes, of the multiple nodes, of the computer network.

6. The method of claim 1 further comprising monitoring the global synchronization log for a notification token, wherein the notification token indicates that the first node is party to private data corresponding to public data on the global synchronization log.

7. The method of claim 4 wherein updating the private data store of the first node comprises executing the computer executable command of the contract to cause a state update to the first node's private data store.

8. The method of claim 1 wherein the first node is a member of a limited subset of the multiple nodes of the computer network that are authorized to receive the private data.

9. The method of claim 1, wherein the private communication channel is physically segregated from the public communication channel, and wherein the public communication channel is a permissioned public channel.

10. The method of claim 1, wherein the private communication channel is an encrypted channel embedded with the public communication channel, and wherein the public communication channel is a permissioned public channel.

11. The method of claim 1, wherein the public data includes a hash value produced from the private data using a cryptographic hash function.

12. The method of claim 11, further comprising verifying, by the first node, the hash value included in the public data based on corresponding private data in the private data store of the first node.

13. The method of claim 1, wherein the public data includes a Merkle root produced from the private data using a cryptographic hash function, and wherein the method further comprises:
- receiving, by the first node, elements of a Merkle tree corresponding to the Merkle root; and
- determining, by the first node, whether the private data should be updated based on the received elements of the Merkle tree.

14. The method of claim 1, further comprising, if the public data is not verified with corresponding private data:
- requesting, by the first node, from other nodes, of the multiple nodes, updated private data;
- receiving, by the first node, from the other nodes the updated private data; and
- verifying, by the first node, the public data received over the public communication channel with the updated private data.

* * * * *